(12) United States Patent
Cooper

(10) Patent No.: US 7,145,481 B2
(45) Date of Patent: Dec. 5, 2006

(54) METHOD AND APPARATUS FOR TRUSTED KEYBOARD SCANNING

(75) Inventor: Barnes Cooper, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 383 days.

(21) Appl. No.: 10/676,888

(22) Filed: Sep. 30, 2003

(65) Prior Publication Data

US 2005/0068203 A1 Mar. 31, 2005

(51) Int. Cl.
*H03M 11/00* (2006.01)
*H03K 17/94* (2006.01)
*G06F 7/04* (2006.01)
*G06F 12/00* (2006.01)
*G06F 12/14* (2006.01)
*G06F 13/00* (2006.01)

(52) U.S. Cl. .................. 341/26; 341/22; 711/163; 726/4; 726/22

(58) Field of Classification Search .......... 341/22, 341/26; 713/200, 182; 711/163; 345/168; 726/4, 22
See application file for complete search history.

(56) References Cited

U.S. PATENT DOCUMENTS

| 5,748,888 | A | 5/1998 | Angelo et al. |
| 6,725,318 | B1 * | 4/2004 | Sherman et al. ............ 710/313 |
| 2002/0166055 | A1 * | 11/2002 | Challener et al. .......... 713/193 |

FOREIGN PATENT DOCUMENTS

| EP | 0 843 250 A1 | 5/1998 |
| EP | 1 286 242 A1 | 2/2003 |
| WO | PCT/US2004/032457 | 1/2005 |

\* cited by examiner

*Primary Examiner*—Jeffery Hofsass
*Assistant Examiner*—Sisay Yacob
(74) *Attorney, Agent, or Firm*—Blakely, Sokoloff, Taylor & Zafman LLP

(57) ABSTRACT

A keyboard scan engine integrated on a chipset to initiate a keyscan process. The keyboard scan engine detects a key depression. When in a trusted mode, the keyboard scan engine transmits a key code, corresponding to the key depression, through a trusted internal bus interface. When in a non-trusted mode, the keyboard scan engine transmits the key code through an interface to be processed by an onboard keyboard controller.

27 Claims, 4 Drawing Sheets

METHOD AND APPARATUS FOR TRUSTED KEYBOARD SCANNING

FIELD OF INVENTION

The field of invention relates generally to trusted computer platforms; and, more specifically, to a method and apparatus for trusted keyboard scanning.

BACKGROUND

Trusted operating systems (OS) and platforms are a relatively new concept. In first generation platforms, a trusted (trusted) environment is created where applications can run trustedly and tamper-free. The security is created through changes in the processor, chipset, and software to create an environment that cannot be seen by other applications (memory regions are protected) and cannot be tampered with (code execution flow cannot be altered). Second generation trusted platforms may add trusted graphics and input/output units. Trusted graphics would allow for the OS to display messages to the end user that cannot be tampered with, and trusted I/O would allow for keystrokes and mouse movements to be entered in a trusted fashion.

In desktop platforms, trusted keystrokes will be entered on an external keyboard. In an environment supporting trusted I/O, the keyboard will need to be certified as a trusted input device, and the hardware and firmware design will need to be certified by one or more third party agencies.

In mobile platforms, an embedded controller, commonly referred to as the keyboard controller, currently supports the integrated keyboard. The keyboard controller is responsible for scanning the matrix keyboard by periodically driving a series of general-purpose output lines in a sequential fashion to the keyboard matrix. By then reading back another series of general-purpose input lines, the keyboard controller can detect keystrokes. Unfortunately, these keystrokes today are sent to the system through the legacy keyboard interface. It is expected that this interface will not be deemed trusted in a trusted environment.

In addition to this, there are many issues, which may prevent mobile embedded controllers from being deemed trusted. These devices contain large amounts of OEM-specific code in the embedded controller to perform duties such as thermal management, power plane control, docking interfaces, ACPI interfacing, all of which is unrelated to keyboard control. The presence of all this unrelated code may not meet the requirements of a trusted I/O device.

FIGURES

Figure 1:
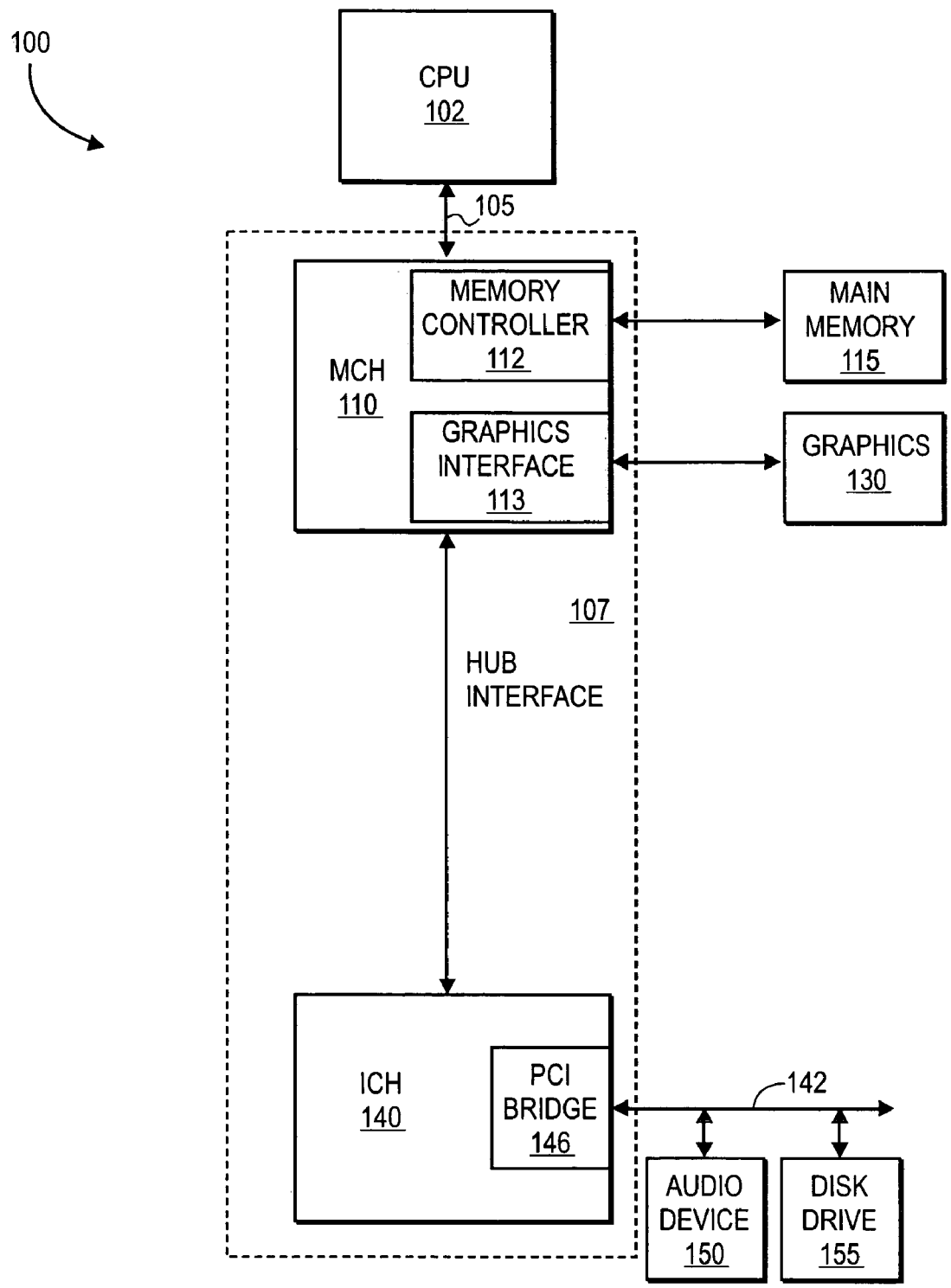
Figure 2:
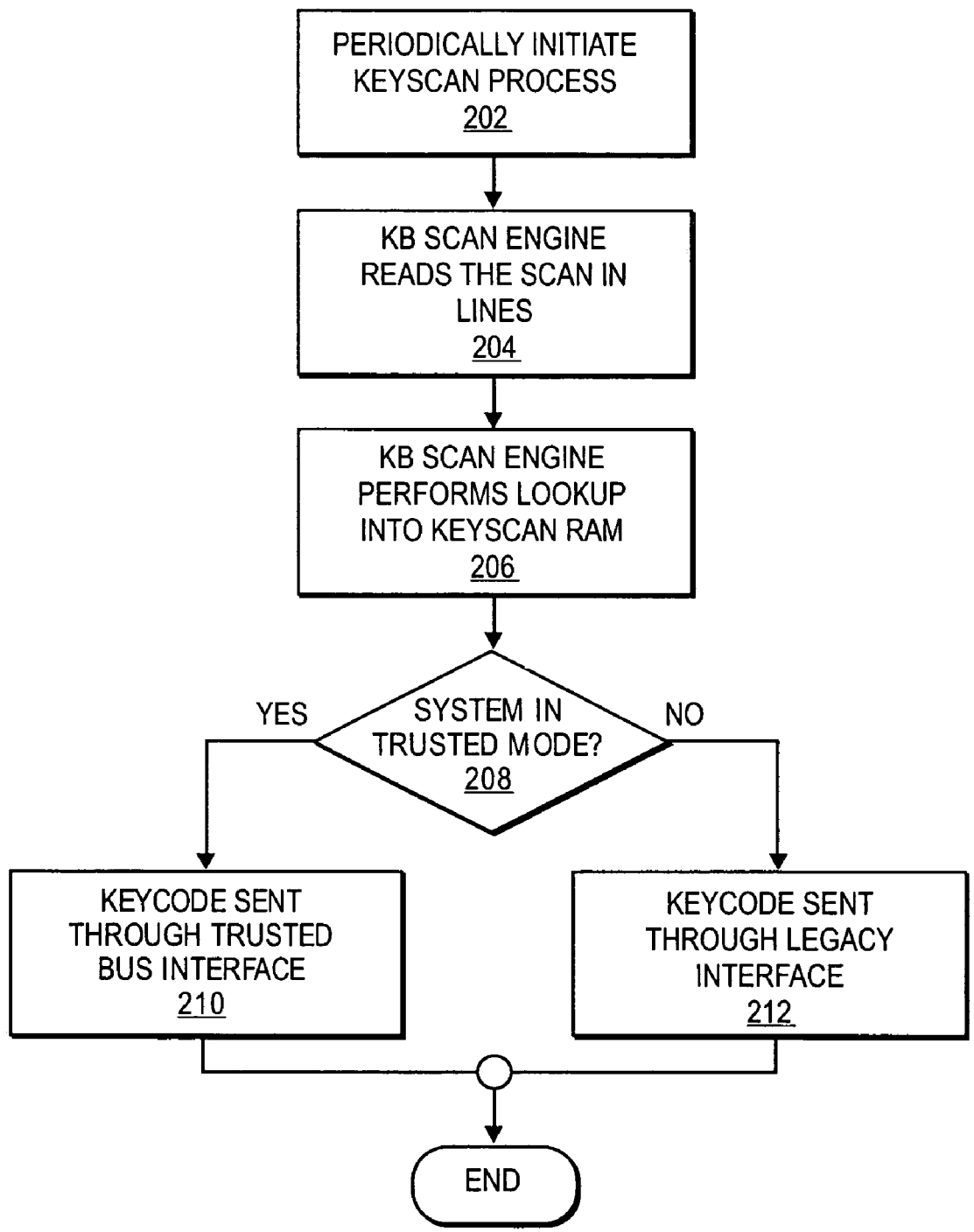
Figure 3:
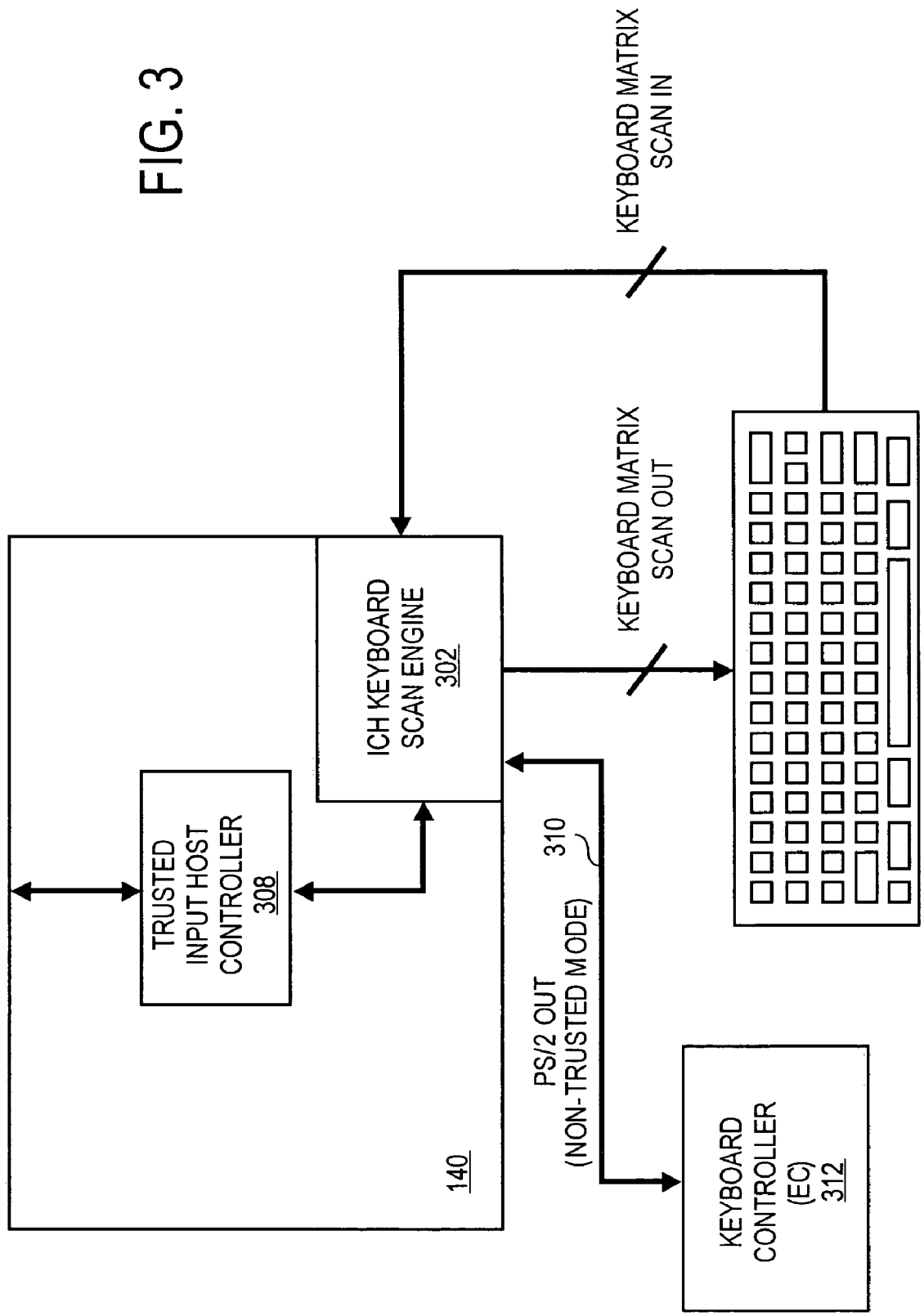
Figure 4:
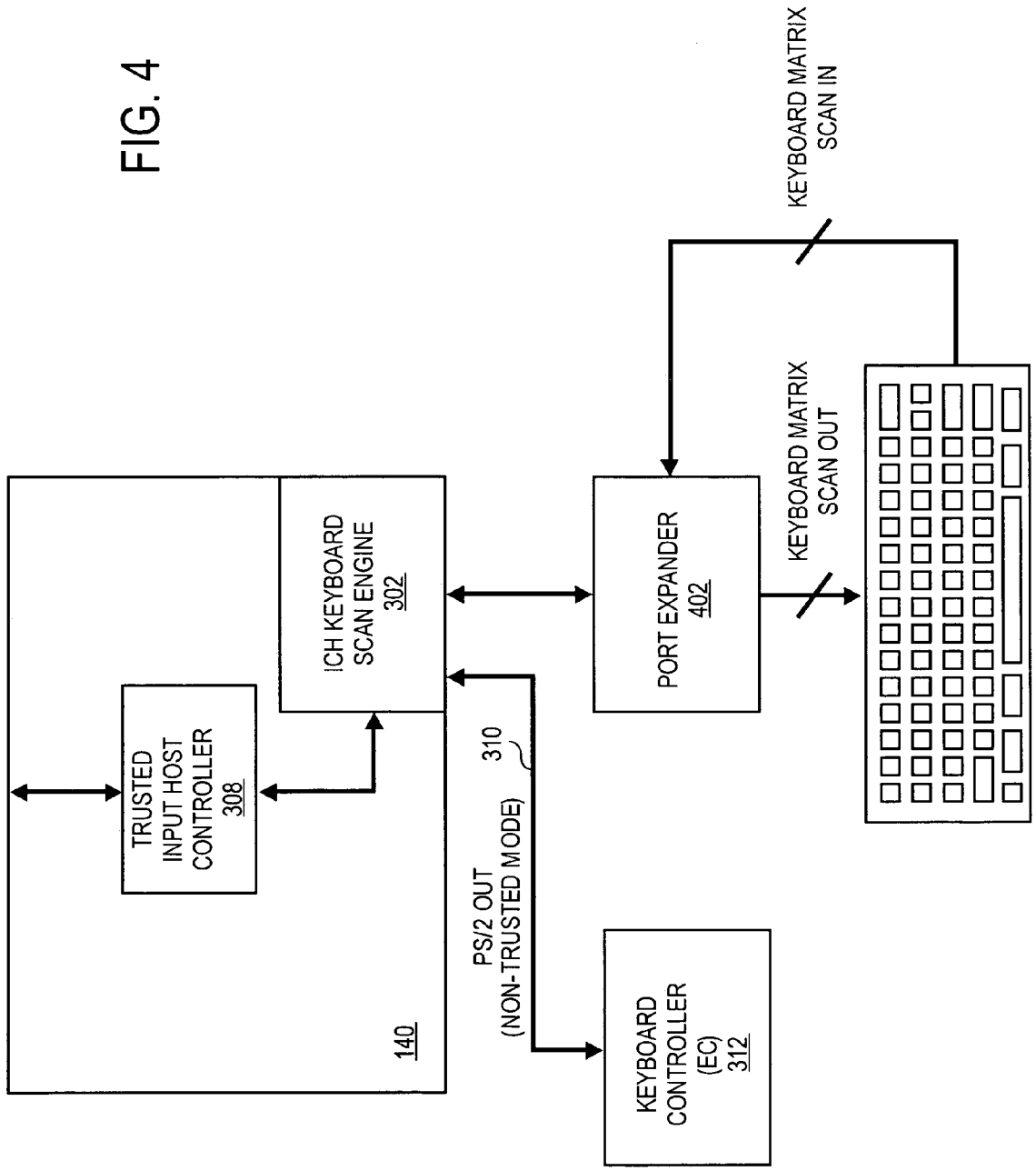

One or more embodiments are illustrated by way of example, and not limitation, in the Figures of the accompanying drawings, in which FIG. 1 illustrates a system implementing a chipset in accordance with one embodiment;

FIG. 2 is a flow diagram describing the processes of providing a trusted keyboard scanning in accordance with one embodiment; and FIG. 3 illustrates a system implementing a trusted keyboard scanning wherein the keyboard scan engine is provided on a chipset component, in accordance with one embodiment; and FIG. 4 illustrates a system implementing a trusted keyboard scanning wherein the keyboard scan engine is provided on a chipset component, in accordance with an alternative embodiment.

DETAILED DESCRIPTION

A method and apparatus for secure keyboard scanning is described. In one embodiment, a keyboard (KB) scanning engine scans out a value to the KB. The KB scan engine reads the scan in lines and detects key depressions on the keyboard. When in a trusted mode, the KB sends a key code, corresponding to the key depression, through a trusted internal bus interface. When the system is not in a trusted mode, the KB scan engine sends the key code through a legacy interface to be processed by an onboard keyboard controller. In one embodiment, the KB scan engine is integrated on a I/O hub controller.

In the following description, numerous specific details are set forth. However, it is understood that embodiments may be practiced without these specific details. In other instances, well-known circuits, structures and techniques have not been shown in detail in order not to obscure the understanding of this description.

Reference throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Typically, in order for a device to be deemed trusted, the implementation must be made available to third parties for review and certification. As a result of this, it is desirable to simplify the implementation such that the implementation can be certified in an easier fashion.

In one embodiment, as described herein, the trusted keyboard scan engine could be integrated in a chipset. In one embodiment in FIG. 1, the chipset 107 includes a memory control hub (MCH) 110. The MCH 110 may include a memory controller 112 that is coupled to a main system memory 115. The MCH 110 may also include a graphics interface 113 coupled to a graphics controller 130. The MCH would also include an interface with the central processing unit (CPU) 102 via a bus 105.

In one embodiment, the MCH is interconnected to an input/output control hub (ICH) 140 via a hub interface. The ICH 140 provides an interface to input/output (I/O) devices within the computer system 100. The ICH 140 may be coupled to a Peripheral Component Interconnect (PCI) bus 142, providing communication with peripherals such as an audio device 150 and a disk drive 155. In such a case, the ICH 140 includes a PCI bridge 146 that provides an interface to a PCI bus 142. The PCI bridge 146 provides a data path between the CPU 102 and peripheral devices.

In one embodiment, as described herein, the KB scan engine is integrated on the ICH of the chipset. As a result of providing the KB scan engine on the ICH, the logic of the KB scan engine can be reviewed by a third party with less of a need to reveal OEM-specific code in their keyboard controller. In alternative embodiments, the KB scan engine could be provided on chipsets other than a chipset that includes MCH and ICH components. For example, the KB scan engine could be provided on one of a variety of I/O hub controllers. In addition, in alternative embodiments, the KB scan engine could be implemented on alternative hardware or embedded firmware mechanisms.

FIG. 2 is a flow diagram describing the processes of providing a trusted keyboard scanning in accordance with one embodiment. The flow diagram of FIG. 2, is described with reference to the system illustrated in FIG. 3, which illustrates one embodiment of trusted keyboard scanning wherein the KB scan engine is provided on the ICH.

As illustrated FIG. 3, the ICH 140 integrates a keyboard scan engine 302 that include a keyscan algorithm. In process 202, the ICH periodically initiates the keyscan process (e.g., every 5 ms). The scan out lines are normally driven to a high (logical one) state. In one embodiment, the keyscan process involves driving each of the scan lines selectively low, while holding the other lines logically high. This process is known as walking a zero from the lowest significant bit to the highest significant bit. Alternative keyscan processes may be used.

In process 204 the keyboard scan engine 302 reads in the scan in lines. If any of the input lines are low, a key depression is detected. After the KB scan engine 302 detects that a key has been depressed for several scan intervals (debounce), the KB scan engine 302 registers the key as being depressed.

In process 206, the KB scan engine 302 performs a lookup into a keyscan random access memory (RAM) (not shown) using the scan out and scan in values as a row/column index, and reads from the RAM the keycode of the depressed key.

In process 208, it is determined whether the system 100 is in trusted mode. In one embodiment, the OS is responsible for initiating the entry into the trusted mode. In one embodiment, the entry into the trusted mode is conveyed and stored in the chipset. Alternative procedures for entering and indicating entry into trusted mode, may be used.

If the system 100 has entered trusted mode, in process 210 the keycode corresponding to the depressed keystrokes is sent through an internal trusted bus interface 308 (e.g., a trusted Universal Serial Bus (USB)). The key code information flows through internal channels in the chipset and are mapped to memory interfaces, such that they can be protected via the memory protection mechanism of the trusted mode.

If the system is in legacy (non-trusted) mode, in process 212 the keycode corresponding to the depressed keystroke is sent out a legacy interface 310 (e.g., a PS/2) to be processed by the onboard keyboard controller 312. In an alternative embodiment, the keycode could be sent to System Management Interface (SMI) for legacy free (non-trusted) keyboard emulation without an embedded controller.

FIG. 4 illustrates a system in accordance with an alternative embodiment. In particular, FIG. 4 illustrates a system 100 using an external hardware component 402 to provide port expansion for the ICH 140. In the embodiment illustrated, using a separate component to provide the input/output expansion may reduce the input/output requirements of the ICH 140. In this case, the ICH 140 still implements the KB scan engine and provides the trusted interface, but may require less pins on the package to support the trusted keyboard scanning.

The processes described above can be stored in the memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method comprising:
   a keyboard scan engine integrated on a chipset initiating a keyscan process;
   the keyboard scan engine detecting a key depression;
   when in a trusted mode, transmitting a key code, corresponding to the key depression, through a trusted internal bus interface and transmitting the key code through a legacy interface when in a non-trusted mode.

2. The method of claim 1, wherein the trusted internal bus interface is a trusted Universal Serial Bus (USB) interface.

3. The method of claim 1, further including:
   when in a non-trusted mode, sending a key code, corresponding to the key depression, through an interface to be processed by an onboard keyboard controller.

4. The method of claim 3, wherein, in the not-trusted mode, the key code is transmitted to the onboard keyboard controller via a PS/2 interface.

5. The method of claim 1, wherein the keyboard scan engine is integrated on an I/O hub controller of the chipset.

6. The method of claim 5, wherein the I/O hub controller includes a port expander interfacing with a keyboard.

7. The method of claim 5, wherein the keyboard scan engine implements a key scan algorithm.

8. A system comprising:
   a central processing unit;
   a memory unit; and
   a keyboard scan engine integrated on a chipset, the keyboard scan engine to initiate a keyscan process, detect a key depression, and, when in a trusted mode, transmit a key code, corresponding to the key depression, through a trusted internal bus interface and transmitting the key code through a legacy interface when in a non-trusted mode.

9. The system of claim 8, wherein the trusted internal bus interface is a trusted Universal Serial Bus (USB) interface.

10. The system of claim 8, further including:
    when in a non-trusted mode, the key code is to be transmitted through an interface to be processed by an onboard keyboard controller.

11. The system of claim 10, wherein, in the not-trusted mode, the key code is to be transmitted to the onboard keyboard controller via a PS/2 interface.

12. The system of claim 8, wherein the keyboard scan engine is integrated on an I/O hub controller of the chipset.

13. The system of claim 12, wherein the I/O hub controller includes a port expander interfacing with a keyboard.

14. The system of claim 12, wherein the keyboard scan engine implements a key scan algorithm.

15. A machine-readable medium having stored thereon a set of instructions, which when executed by a processor, perform a method comprising:
- a keyboard scan engine integrated on a chipset initiating a keyscan process;
- the keyboard scan engine detecting a key depression;
- when in a trusted mode, transmitting a key code, corresponding to the key depression, through a trusted internal bus interface and transmitting the key code through a legacy interface when in a non-trusted mode.

16. The machine-readable medium of claim 15, wherein the trusted internal bus interface is a trusted Universal Serial Bus (USB) interface.

17. The machine-readable medium of claim 15, further including:
- when in a non-trusted mode, sending a key code, corresponding to the key depression, through an interface to be processed by an onboard keyboard controller.

18. The machine-readable medium of claim 17, wherein, in the not-trusted mode, the key code is transmitted to the onboard keyboard controller via a PS/2 interface.

19. The machine-readable medium of claim 15, wherein the keyboard scan engine is integrated on an I/O hub controller of the chipset.

20. The machine-readable medium of claim 19, wherein the I/O hub controller includes a port expander interfacing with a keyboard.

21. The machine-readable medium of claim 19, wherein the keyboard scan engine implements a key scan algorithm.

22. A system comprising:
- a central processing unit;
- a memory unit;
- a graphics controller; and
- a keyboard scan engine integrated on a chipset, the keyboard scan engine to initiate a keyscan process, detect a key depression, and, when in a trusted mode, transmit a key code, corresponding to the key depression, through a trusted internal bus interface and transmitting the key code through a legacy interface when in a non-trusted mode.

23. The system of claim 22, wherein the trusted internal bus interface is a trusted Universal Serial Bus (USB) interface.

24. The system of claim 22, further including:
- when in a non-trusted mode, the key code is to be transmitted through an interface to be processed by an onboard keyboard controller.

25. The system of claim 24, wherein, in the not-trusted mode, the key code is to be transmitted to the onboard keyboard controller via a PS/2 interface.

26. The system of claim 22, wherein the keyboard scan engine is integrated on I/O hub controller of the chipset.

27. The system of claim 26, wherein the I/O hub controller includes a port expander interfacing with a keyboard.

* * * * *